United States Patent [19]
Cope

[11] Patent Number: 5,553,941
[45] Date of Patent: Sep. 10, 1996

[54] THERMOMETER AND BOTTLE CAP ASSEMBLY

[75] Inventor: Gil Cope, New York, N.Y.

[73] Assignee: Safety-Temp Ltd., Santa Monica, Calif.

[21] Appl. No.: 198,824

[22] Filed: Feb. 18, 1994

[51] Int. Cl.⁶ .................. A61J 9/02; A61J 9/04; G01K 1/08
[52] U.S. Cl. .......... 374/150; 374/208; 215/11.2; 215/11.5
[58] Field of Search ............ 374/150, 149, 374/205, 116, 102, 141, 208; 215/11.2, 11.5, 274, 276, 350; 220/319

[56] References Cited

U.S. PATENT DOCUMENTS

| | | | |
|---|---|---|---|
| 2,346,832 | 4/1944 | Eisele . | |
| 2,357,692 | 9/1944 | Saffady . | |
| 2,387,573 | 10/1945 | Ganson | 215/11.5 |
| 2,648,226 | 8/1953 | Finch . | |
| 2,724,274 | 11/1955 | Rose . | |
| 2,755,665 | 7/1956 | Muncheryan . | |
| 2,814,202 | 11/1957 | Frans . | |
| 2,866,338 | 12/1958 | Muncheryan . | |
| 2,981,108 | 4/1961 | Andersen et al. | 374/150 |
| 3,189,234 | 6/1965 | Thomson | 215/11.5 |
| 3,559,484 | 2/1971 | Kita . | |
| 3,567,059 | 3/1971 | Litman . | |
| 3,722,728 | 3/1973 | Yazaki | 215/11.5 |
| 3,864,976 | 2/1975 | Parker . | |
| 4,538,926 | 9/1985 | Chretien . | |
| 4,595,301 | 6/1986 | Taylor | 374/208 |
| 4,626,643 | 12/1986 | Minet | 374/149 |
| 4,637,737 | 1/1987 | Ricchio . | |
| 4,917,262 | 4/1990 | Mita | 220/366.1 |
| 5,000,581 | 3/1991 | Yata et al. | 215/11.2 |

Primary Examiner—William A. Cuchlinski, Jr.
Assistant Examiner—Andrew Hirshfeld
Attorney, Agent, or Firm—Brooks Haidt Haffner & Delahunty

[57] ABSTRACT

A cap for a baby nursing bottle is provided with a stainless steel housed bimetallic thermometer probe. The probe is connected to a dial indicator with the mechanism hermetically sealed within a housing. The housing is either a separate metal and transparent window enclosure mounted in the crown of a plastic cap or an enclosure formed by a transparent window and a top wall of the cap. The complete assembly is suitable for use in microwave ovens. The bottle cap has one or more venting grooves for bypassing the thermometer housing or bottle mouth.

22 Claims, 5 Drawing Sheets

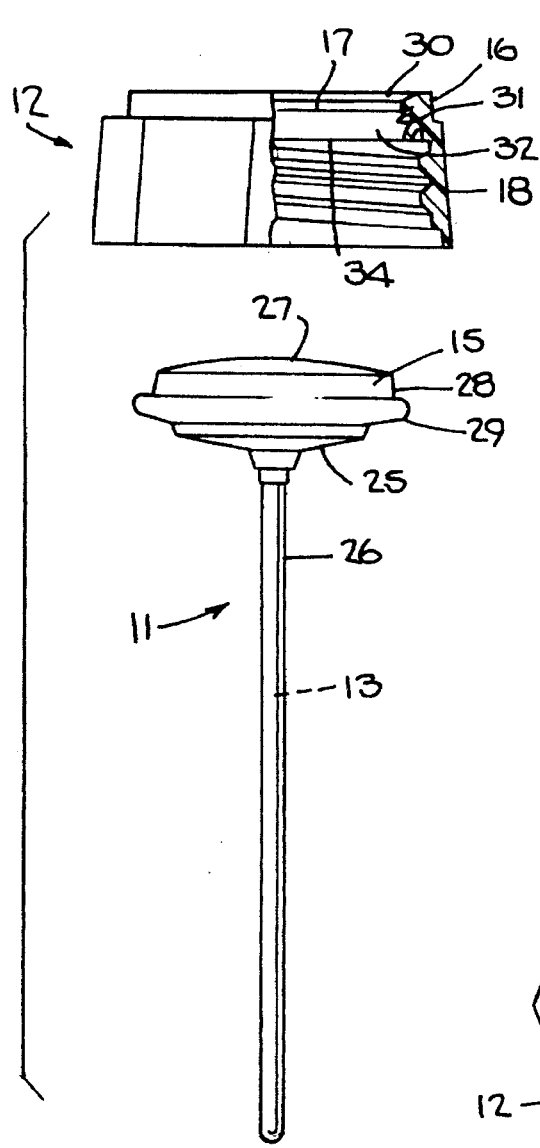
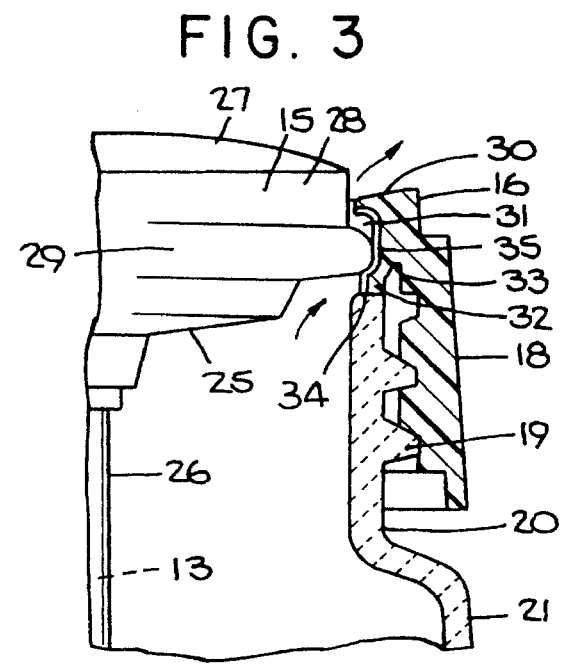
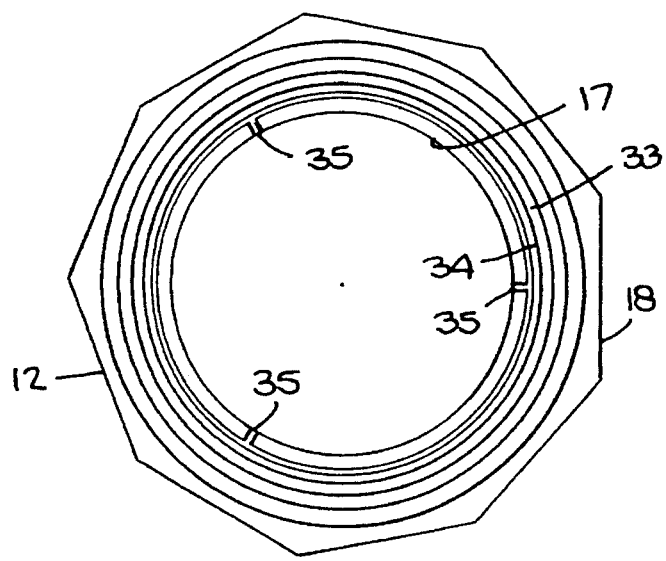
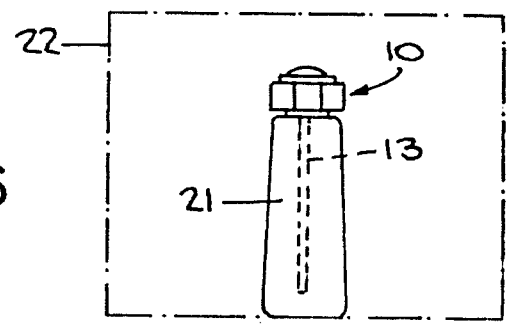
FIG. 3
FIG. 4
FIG. 5
FIG. 6

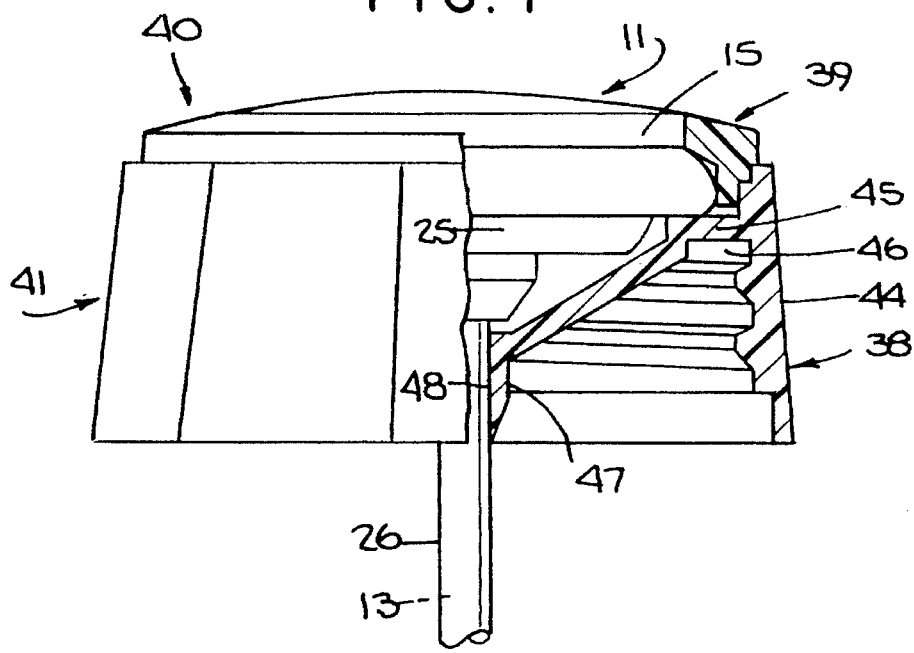
FIG. 7
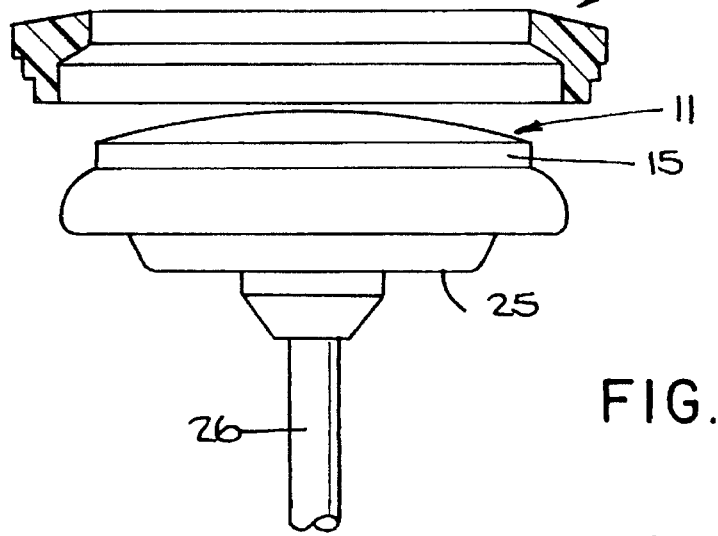
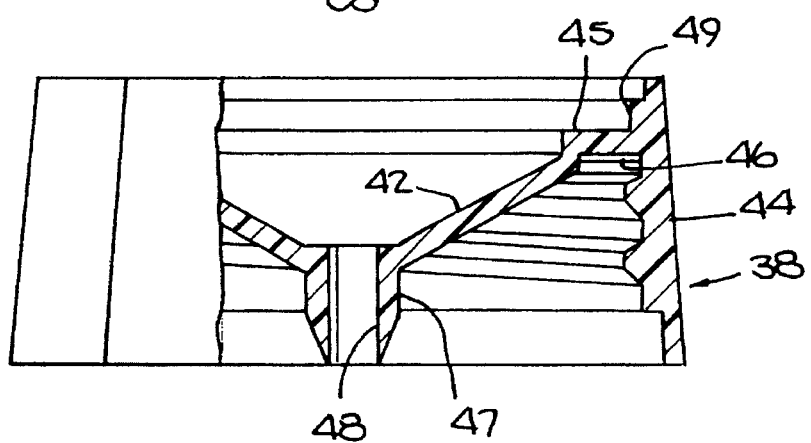
FIG. 8

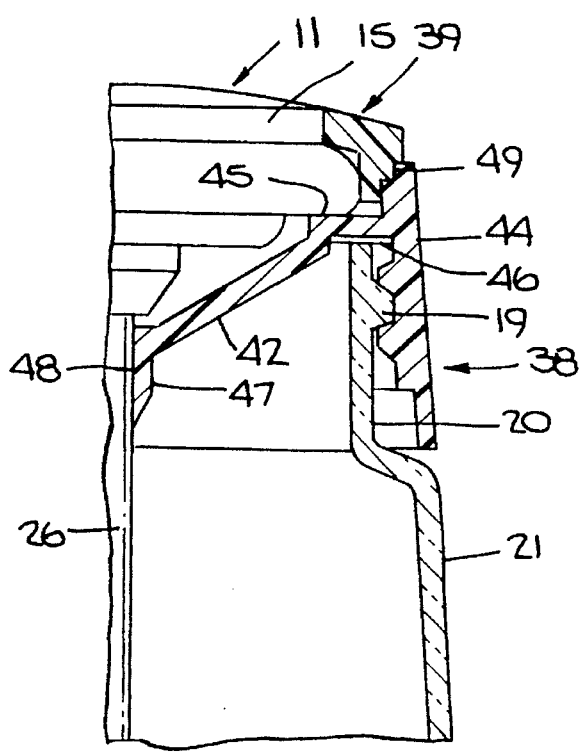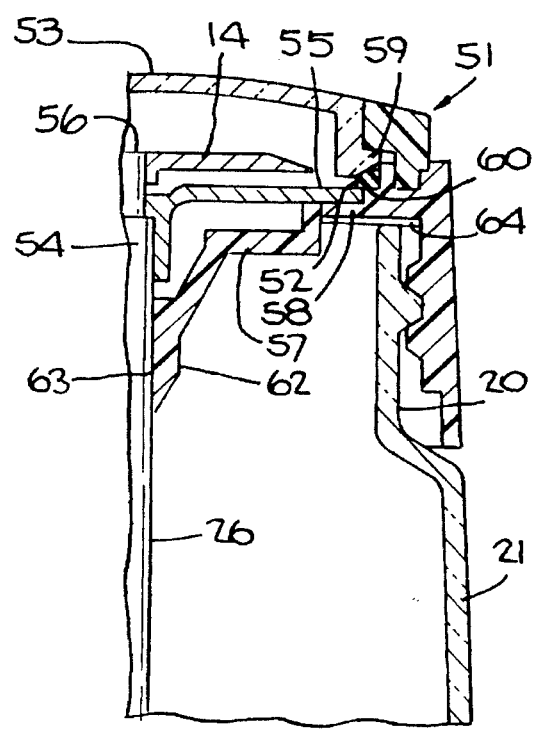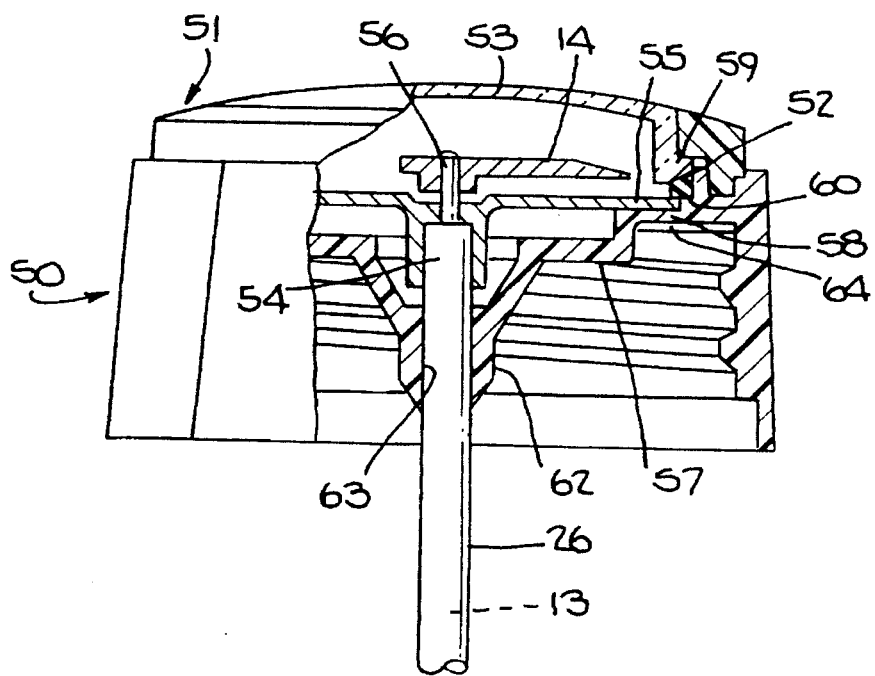

THERMOMETER AND BOTTLE CAP ASSEMBLY

BACKGROUND OF THE INVENTION

The present invention relates to a thermometer for use in a microwave oven, and, particularly, to a thermometer for use in controlled warming of the contents of an infant's bottle in a microwave oven.

Especially in the preparation of formula for infant feeding it is important that the formula be heated to a temperature between about 82° and 98° F. Formula that is too hot can scald a baby's mouth while if it is too cold it is hard to digest. Most parents are undoubtedly familiar with the age old test where a few drops of warmed formula are expressed onto the inside of the wrist. That technique provides approximate information at best.

Various attempts have been made to provide nursing bottles with thermometers. However, heretofore, as far as is presently known, there has not been available a thermometer for use with a nursing bottle that could be used in a microwave oven.

SUMMARY OF THE INVENTION

It is, therefore, an object of the present invention to provide a thermometer with a highly visible dial indicator that is adapted for measuring the temperature of the contents of a nursing bottle when heated in a microwave oven.

A further object is to provide such thermometer that is suitable for also measuring the temperature of a nursing bottle contents during heating by any conventional method.

In accordance with one aspect of the present invention there is provided a thermometer and bottle cap assembly wherein said thermometer is or the type comprising a metallic sheathed temperature responsive probe joined to a dial indicator, the latter being disposed within a disc-like housing. The housing is retained within the crown of the bottle cap viewable through a central opening in the top of the crown. The cap is provided with an internally threaded skirt extending away from the thermometer dial housing for threaded engagement with external threads about the neck of a bottle. The probe extends from substantially the center of the dial housing for disposition substantially along the longitudinal axis of the bottle, while the dial housing and probe are constructed for safe use in a microwave oven.

In accordance with another aspect of the present invention, instead of the dial indicator being disposed within a disc-like housing, the bottle cap has a top wall for closing the open mouth of a bottle and an internally threaded skirt extending away from the perimeter of said top wall for threaded engagement with external threads about the neck of said bottle. The dial indicator is disposed above the top wall of the cap isolated from the threaded skirt. A transparent window member is disposed over the dial indicator, and means are provided for joining said window member to said top wall and said skirt for providing a bottle cap assembly with said dial indicator hermetically sealed within an enclosure formed by said window member and said top wall. The probe extends through substantially the center of the top wall of the cap for disposition substantially along the longitudinal axis of said bottle with said probe and dial indicator constructed for safe use in a microwave oven.

BRIEF DESCRIPTION OF THE DRAWINGS

The invention will be better understood after reading the following detailed description of the presently preferred embodiments with reference to the appended drawings in which:

FIG. 3 is a fragmentary elevational view showing the thermometer/cap assembly of FIG. 1 attached to the neck of a nursing bottle;

FIG. 4 is an exploded elevational view of the thermometer and bottle cap with the cap in quarter section showing the components prior to assembling;

FIG. 5 is a bottom plan view of the bottle cap with the thermometer removed showing a plurality of vent grooves;

FIG. 6 is a diagrammatic illustration of a bottle capped by the assembly of FIG. 1 and situated in a microwave oven;

FIG. 7 is a view similar to FIG. 1 but showing another embodiment of the invention;

FIG. 8 is an exploded elevational view of the components in the embodiment of FIG. 7 with the parts of the bottle cap in either full or partial section and with the lower portion of the thermometer probe broken away;

FIG. 9 is a fragmentary elevational view showing the thermometer/cap assembly of FIG. 7 attached to the neck of a nursing bottle;

FIG. 10 is a view similar to FIGS. 1 and 7 but showing a further embodiment of the present invention in which the bottle cap provides the housing for the thermometer indicator dial instead of the thermometer mechanism having its own housing;

FIG. 12 is a fragmentary elevational view showing the thermometer/cap assembly of FIG. 10 attached to the neck of a nursing bottle.

The same reference numerals are used throughout the figures of the drawings to designate the same or similar parts.

DETAILED DESCRIPTION OF THE PRESENTLY PREFERRED EMBODIMENTS

Figure 1:
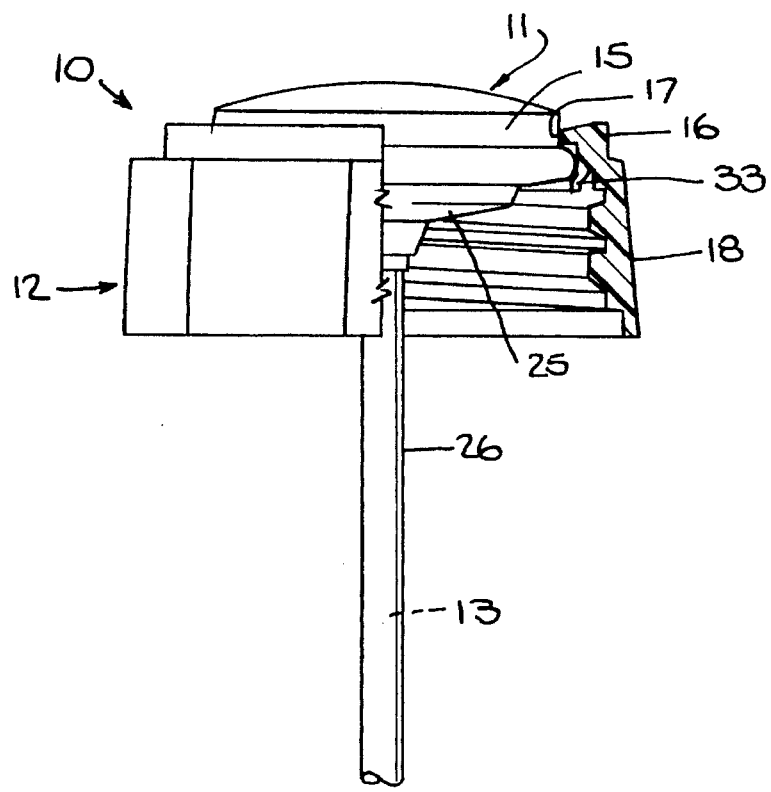
FIG. 1 is a quarter sectioned elevational view of a thermometer and bottle cap assembly embodying the present invention.
Figure 2:
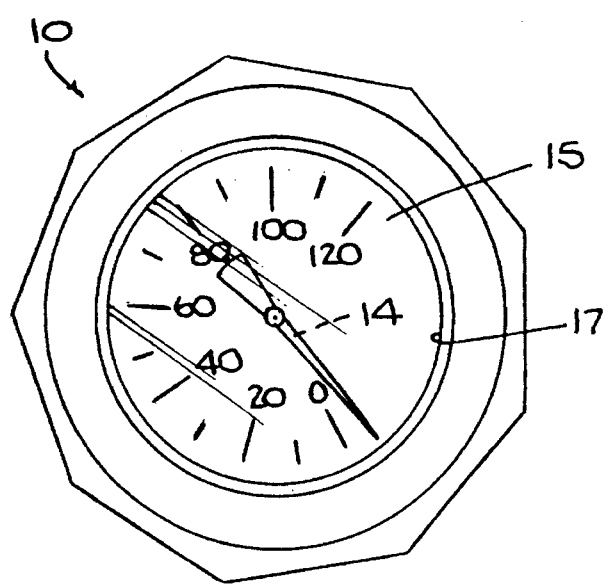
FIG. 2 is a top plan view of the assembly of FIG. 1.

Referring now to FIGS. 1 to 6 of the drawings, a thermometer and bottle cap assembly embodying the present invention is designated generally by the reference numeral 10, and comprises a thermometer unit 11 and a bottle cap 12. The thermometer 11 is of the type having a metallic sheathed temperature responsive bimetallic probe 13 (the details of which are well known but not shown) joined to a dial indicator 14, the latter being hermetically sealed within a metal and glass or metal and plastic disc-like housing 15. The housing 15 is retained within the crown area 16 of the bottle cap 12 with the dial indicator 14 viewable through a central opening 17 in the top of the cap crown 16. The cap 12 is provided with an internally threaded skirt 18 extending away from the thermometer dial housing 15 for threaded engagement, as best seen in FIG. 3, with external threads 19 about the neck 20 of a nursing or baby bottle 21. The probe 13 extends from substantially the center of the dial housing 15 for disposition substantially along the longitudinal axis of the bottle 21. The dial housing 15, probe 13 and cap 12 are all constructed for safe use in a microwave oven, indicated symbolically by the numeral 22 in FIG. 6.

The bottle cap is formed of a non-metallic material. Presently it is preferred to mold the cap 12 from polypropylene resin.

The dial housing 15 has a first wall 25 to which is joined a stem 26 for housing the probe 13, a window 27 spaced from the wall 25, and a circumferential wall 28 joining the window 27 to the first wall 25. The wall 28 has a round nosed perimetrical protuberance 29.

The bottle cap 12 has, commencing at its crown 16, the central opening 17 bounded by a radially inwardly directed flange 30, an internal radially outwardly directed circumferential groove 31 accommodating and embracing in assembled condition the housing protuberance 29 with a snug fit. To enable insertion of the thermometer housing 15 into the cap 12, the cap 12 is provided with resilient means in the form of a continuous circumferential lip 32 extending from the top of the crown 16 in the general direction of the longitudinal axis of the cap 12 bounded by a longitudinally directed annular channel 33 separating the lid 32 from the skirt 18. The lip 32 terminates in a sealing edge 34 for engaging the mouth of the bottle 21 when the cap is threadedly assembled to the bottle 21 as shown in FIG. 3.

As shown in FIGS. 3 and 5, the cap 12 is provided with means in the form of a plurality of circumferentially equidistantly disposed longitudinally oriented V-grooves 35 for bypassing the dial housing 15 from the circumferential lip 32 to the flange 30 for venting gas or vapor from the bottle 21 when the liquid contents is heated.

It should be evident from a consideration of the drawings that the circumferential rounded nose protuberance 29 of the thermometer housing 12 engages the resilient lip 32 of the cap 12 and spreads the lip 32 radially outwardly upon inserting the thermometer 11 into the cap 12 from the position shown in FIG. 4. The protuberance Is able to snap past the lip 32 to enter the groove 31 where it is retained with a snug fit.

The probe 13 can be constructed with various lengths to fit the standard range of nursing bottle sizes.

A suitable thermometer is a bimetal hermetically sealed instrument manufactured by the Industrial Valve and Instrument Division of Dresser Industries. It is identified as an Ashcroft Commercial Bimetal Thermometer, type 13 GC OOR −20°/120° F. Another suitable unit by the same manufacturer is identified as an Ashcroft 1⅜" Pocket Test Bi-Metal Dial Thermometer, type 13 FT 5OR 050 −20°/120° F. The case of both models is of all stainless steel welded construction. Heretofore, it was not appreciated that these particular thermometers could be used safely within a microwave oven, at least under the conditions described herein. Obviously, the thermometer and cap assembly can be used with a baby bottle when subjected to any other conventional heating method.

For ease of reading, the safe temperature zone can be indicated on the dial by a contrasting colored wedge or the like (not shown).

Referring now to FIGS. 7, 8 and 9, there is shown another embodiment of the thermometer and bottle cap assembly. The thermometer can be the same as that described with reference to FIGS. 1 to 6 and is similarly identified in FIGS. 7 to 9. However, the bottle cap is now produced in two parts, a main body 38 and a top ring 39, which when assembled are as shown in FIG. 7, the entire assembly being designated generally by the reference numeral 40. The cap, designated by the numeral 41, has a top wall 42 for closing the open mouth of a bottle. See the bottle 21 in FIG. 9. As with the first embodiment, this embodiment has an internally threaded skirt 44 extending away from the perimeter of the top wall 42 for threaded engagement, as seen in FIG. 9, with the external threads 19 about the neck 20 of the nursing bottle 21. The dial indicator and its enclosing dial housing 15 are disposed above the top wall 42 isolated from the threaded skirt 44.

As seen in FIGS. 7 to 9, the top wall 42 of the cap 41 has a flat radial periphery 45 radially inward of the skirt 44 for seating, as shown in FIG. 9, upon the mouth of the bottle 21. For venting gas or vapor from the bottle 21 when the latter contains liquid and is heated, at least one radial groove 46 is provided in the flat periphery 45 of the top wall 42 on the underside thereof for bypassing the mouth of the bottle 21 when the thermometer and bottle cap assembly is applied thereto. The center of the top wall 42 of the cap 41, on its underside, is provided with a central hub 47 through which is formed a bore 48. The stem 26 of the probe 13 is inserted with a force fit through the bore 48 as best seen in FIG. 7.

The separate components are shown in FIG. 8. Assembly is accomplished by pressing the stem 26 of the thermometer 11 through the bore 48 until the bottom wall 25 of the dial housing 15 seats on the shelf provided by the radial periphery 45 of the wall 42. Thereafter the top ring 39 is placed over the dial housing 15 and inserted into the stepped upper region 49 of the main body section 38 of the bottle cap as best seen in FIG. 9. At present, it is preferred to fabricate the parts 38 and 39 from polypropylene resin and to unite the two using ultrasonic welding to produce the final assembly as shown in FIGS. 7 and 9.

Both embodiments described above make use of a totally self-contained thermometer 11 in which the dial indicator mechanism 14 (see FIG. 2) is housed in its own housing 15. However, it may be preferred to eliminate redundancy in which case resort can be had to the embodiment shown in FIGS. 10 to 12 to which attention should now be directed.

Figure 11:
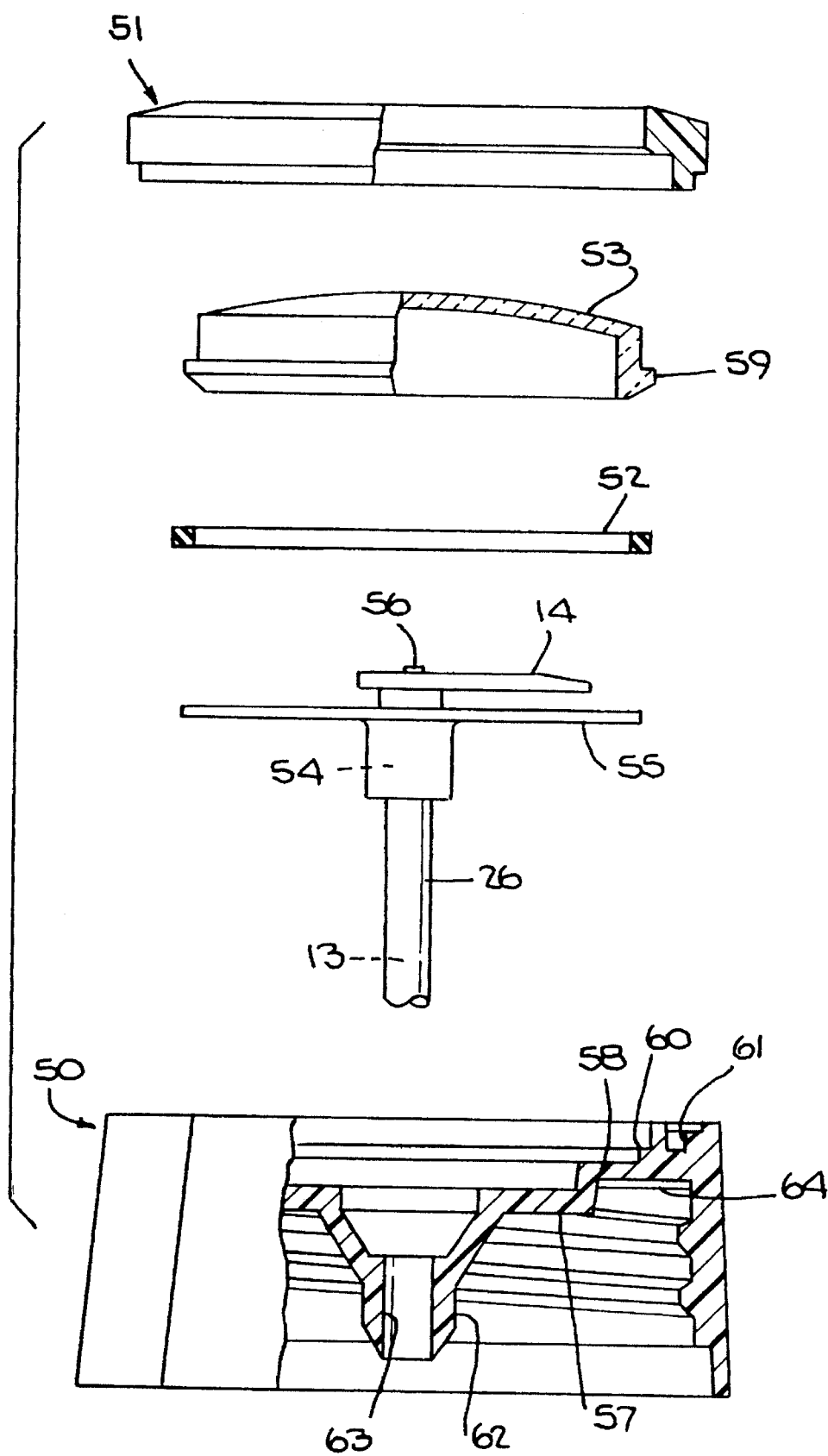
FIG. 11 is an exploded elevational view of the components in the embodiment of FIG. 9.

As shown in FIGS. 10 to 12, the bottle cap comprises a main body section 50, a top ring 51, a gasket 52, and a transparent window or crystal 53. The thermometer comprises a bimetallic element 13 (not shown) contained within a metal stem tube 26, similar to the thermometer 11 in FIG. 1. However, the connection of the upper end 54 of the stem 26 to the dial face plate 55 is no longer concealed within a separate housing. The same is true of the pointer 14 mounted on the upper end of the wire shaft 56 which connects with the bimetallic element (not shown) within the stem 26. As best seen in FIGS. 10 and 12, the dial face plate 55 sits on the flat radial ledge 58 formed by the radial periphery of the top wall 57. The gasket 52 has a rectangular cross-section and is interposed between the flange 59 on the window or "crystal" 53 and a step 60 on the top wall 57. The step 60 and gasket 52 are dimensioned such that the gasket overlaps the periphery of the dial plate 55. Thus, when the top ring 51 is placed over the window 53, interfitted in the channel 61 in the main body section 50, and ultrasonically welded to the latter while applying downward pressure to the window flange 59 and gasket 52, an hermetically sealed enclosure for the dial mechanism is produced. Again, the components 50 and 51 are preferably fabricated from polypropyline resin. The window 53 can be made from a suitable polycarbonate resin.

Similar to the first two embodiments, the top wall 57 has a central hub 62 provided with a through bore 63. The thermometer stem 26 is pressed through the bore 63 with which it makes a press or force fit.

One or more radial grooves 64 are formed on the underside of the flat radial periphery of the top wall 57, similar to the embodiment in FIG. 7, to provide for venting vapors over the mouth of the bottle 21 as shown in FIG. 12.

Hermetic sealing of the thermometer mechanism is desirable to permit washing of the thermometer/bottle cap assembly without damaging the mechanism. It is assumed that immersion will be unavoidable if thorough cleaning is to be accomplished. Since the assembly is to be used with infant nursing bottles, careful cleaning after each use becomes essential.

Having described the presently preferred embodiment of the invention, it should be apparent to those skilled in the art that various changes in construction can be introduced without departing from the true spirit of the invention as defined in the appended claims.

What is claimed is:

1. A thermometer and bottle cap assembly wherein said thermometer is of the type comprising a metallic sheathed temperature responsive probe joined to a dial indicator, the latter being disposed within a disc-like housing, said disc-like housing having a first wall to which is joined a stem for housing said probe, a window spaced from said first wall, and a circumferential wall joining said window to said first wall, said circumferential wall having a perimetrical protuberance, said disc-like housing being retained within the crown of said bottle cap viewable through a central opening in the top of said crown, said cap being provided with an internally threaded skirt extending away from said disc-like housing for threaded engagement with external threads about the neck of a bottle, said probe extending from substantially the center of said disc-like housing for disposition substantially along the longitudinal axis of said bottle, said cap further having commencing at the cap crown, said central opening bounded by a radially inwardly directed flange, an internal radially outwardly directed circumferential channel accommodating and embracing said circumferential wall protuberance with a substantially snug fit, and a circular top wall joined at its perimeter to said skirt and extending across the diameter of said skirt below said disc-like housing with said probe passing through the center of said top wall, said assembly being constructed for safe use in a microwave oven.

2. A thermometer and bottle cap assembly according to claim 1, wherein said cap is provided with means for venting gas or vapor from said bottle when said bottle contains liquid and said liquid is heated.

3. A thermometer and bottle cap assembly according to claim 2, wherein said circular top wall of said cap has a flat radial periphery radially inward of said skirt for seating upon the mouth of said bottle, and said venting means comprises at least one radial groove formed in said flat periphery of said top wall for bypassing the mouth of said bottle when said assembly is applied thereto.

4. A thermometer and bottle cap assembly according to claim 3, wherein said top wall, said skirt, and the threads on said skirt are all configured and dimensioned to fit on the threaded neck of a baby nursing bottle.

5. A thermometer and bottle cap assembly wherein said thermometer is of the type comprising a metallic sheathed temperature responsive probe joined to a dial indicator, said cap has a top wall for closing the open mouth of a bottle and an internally threaded skirt extending away from the perimeter of said top wall for threaded engagement with external threads about the neck of said bottle, said dial indicator is disposed above said top wall isolated from said threaded skirt, a transparent window member is disposed over said dial indicator, and means are provided for joining said window member to said top wall and said skirt for providing an assembly with said dial indicator hermetically sealed within an enclosure formed by said window member and said top wall, said probe extending through substantially the center of said top wall for disposition substantially along the longitudinal axis of said bottle, said probe and dial indicator being constructed for safe use in a microwave oven.

6. A thermometer and bottle cap assembly according to claim 5, wherein said top wall, said skirt, and the threads on said skirt are all configured and dimensioned to fit on the threaded neck of a baby nursing bottle.

7. A thermometer and bottle cap assembly according to claim 5, wherein said cap is provided with means for venting gas or vapor from said bottle when said bottle contains liquid and said liquid is heated.

8. A thermometer and bottle cap assembly according to claim 7, wherein said top wall of said cap has a flat radial periphery radially inward of said skirt for seating upon the mouth of said bottle, and said venting means comprises at least one radial groove formed in said flat periphery of said top wall for bypassing the mouth of said bottle when said assembly is applied thereto.

9. A thermometer and bottle cap assembly according to claim 8, wherein said top wall, said skirt, and the threads on said skirt are all configured and dimensioned to fit on the threaded neck of a baby nursing bottle.

10. A thermometer and bottle cap assembly wherein said thermometer is of the type comprising a metallic sheathed temperature responsive probe joined to a dial indicator, the latter being disposed within a disc-like housing, said disc-like housing having a first wall to which is joined a stem for housing said probe, a window spaced from said first wall, and a circumferential wall joining said window to said first wall, said circumferential wall having a perimetrical protuberance; said disc-like housing being retained within the crown of said bottle cap viewable through a central opening in the top of said crown, said cap being provided with an internally threaded skirt extending away from said disc-like housing for threaded engagement with external threads about the neck of a bottle, said probe extending from substantially the center of said disc-like housing for disposition substantially along the longitudinal axis of said bottle; and said bottle cap has commencing at the bottle cap crown, said central opening bounded by a radially inwardly directed flange, an internal radially outwardly directed circumferential groove accommodating and embracing said circumferential wall protuberance with a substantially snug fit, and resilient means underlying said circumferential wall protuberance for retaining said disc-like housing within said crown but deflectable for permitting said disc-like housing to be translated in the direction of the longitudinal axis of said bottle cap into engagement with said groove; said assembly being constructed for safe use in a microwave oven.

11. A thermometer and bottle cap assembly according to claim 10, wherein said bottle cap is formed of non-metallic material.

12. A thermometer and bottle cap assembly according to claim 11, wherein said resilient means comprises a continuous circumferential lip extending from the top of said crown in the general direction of the longitudinal axis of said cap bounded by a longitudinally directed annular channel separating said lip from said skirt, said lip terminating in a sealing edge for engaging the mouth of said bottle when said cap is threadedly assembled thereto.

13. A thermometer and bottle cap assembly according to claim 12, wherein said cap is provided with means for venting gas or vapor from said bottle when said bottle contains liquid and said liquid is heated.

14. A thermometer and bottle cap assembly according to claim 13, wherein said venting means comprises at least one longitudinally oriented groove for bypassing said disk-like housing from said circumferential lip to said flange.

15. A thermometer and bottle cap assembly according to claim 14, wherein there are three of said longitudinally oriented grooves equidistantly disposed circumferentially about said cap.

16. A thermometer and bottle cap assembly according to claim 10, wherein said resilient means comprises a continuous circumferential lip extending from the top of said crown in the general direction of the longitudinal axis of said cap bounded by a longitudinally directed annular channel separating said lip from said skirt, said lip terminating in a sealing edge for engaging the mouth of said bottle when said cap is threadedly assembled thereto.

17. A thermometer and bottle cap assembly according to claim 16, wherein said cap is provided with means for venting gas or vapor from said bottle when said bottle contains liquid and said liquid is heated.

18. A thermometer and bottle cap assembly according to claim 17, wherein said venting means comprises at least one longitudinally oriented groove for bypassing said dial housing from said circumferential lip to said flange.

19. A thermometer and bottle cap assembly according to claim 18, wherein there are three of said longitudinally oriented grooves equidistantly disposed circumferentially about said cap.

20. A thermometer and bottle cap assembly according to claim 10, wherein said cap is provided with means for venting gas or vapor from said bottle when said bottle contains liquid and said liquid is heated.

21. A thermometer and bottle cap assembly according to claim 20, wherein said venting means comprises at least one longitudinally oriented groove for bypassing said disc-like housing from said resilient means to said flange.

22. A thermometer and bottle cap assembly according to claim 21, wherein there are three of said longitudinally oriented grooves equidistantly disposed circumferentially about said cap.

* * * * *